April 15, 1924.
C. V. SMOTHERS
AUTOMOBILE BED
Filed July 17, 1923
1,490,491
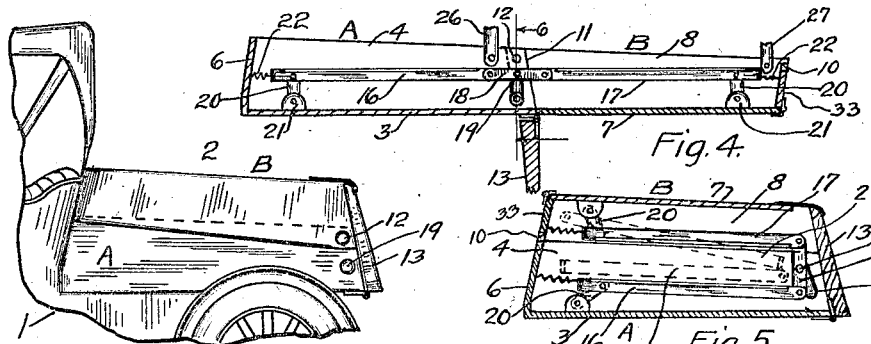
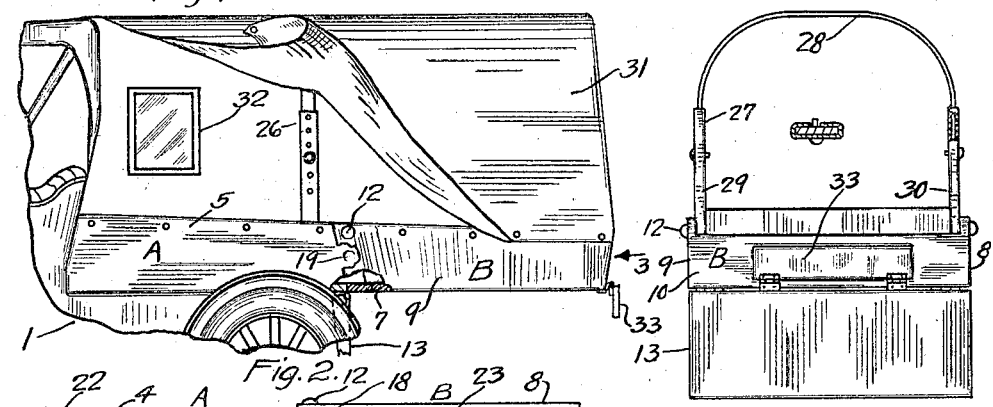
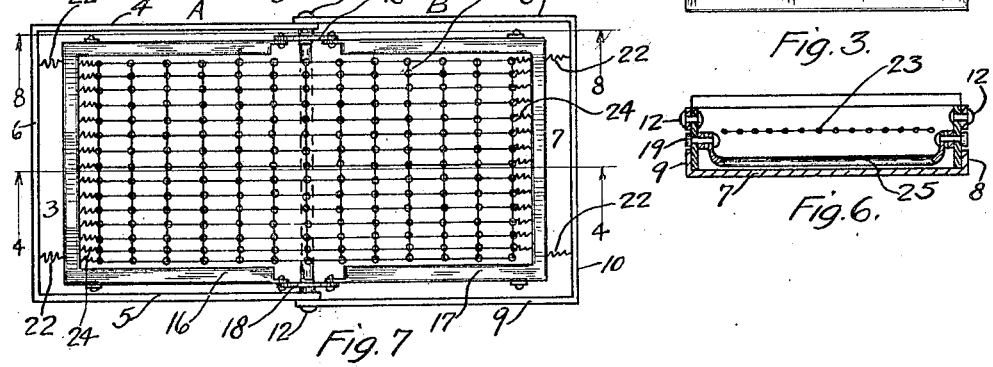
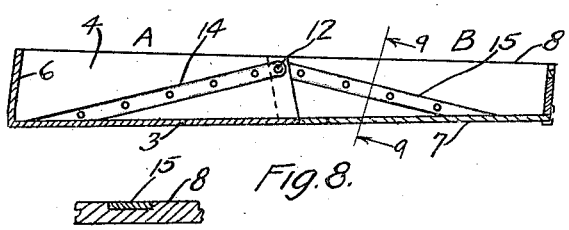
Inventor
Clifford V. Smothers
By H. J. O'Brien
Attorney Patented Apr. 15, 1924.

1,490,491

UNITED STATES PATENT OFFICE.

CLIFFORD V. SMOTHERS, OF DENVER, COLORADO.

AUTOMOBILE BED.

Application filed July 17, 1923. Serial No. 652,023.

*To all whom it may concern:*

Be it known that I, CLIFFORD V. SMOTHERS, citizen of the United States, residing at the city and county of Denver and State of Colorado, have invented certain new and useful Improvements in Automobile Beds; and I do declare the following to be a full, clear, and exact description of the invention, such as will enable others skilled in the art to which it appertains to make and use the same, reference being had to the accompanying drawings and to the characters of reference marked thereon, which form a part of this specification.

This invention relates to beds and has special reference to a type of foldable bed which may be built into the body of an automobile or attached thereto.

It is the object of this invention to produce a bed that can be readily attached to a runabout body and which needs only to be unfolded to form a comfortable bed.

I am aware that folding beds of this general type have been built and I do not claim to be the original inventor of this idea in its broadest aspect, but I have improved on the beds of this type by attaching thereto a spring which is formed in such a manner it will fold easily and when folded will provide a space for the bedding.

In order to better and more clearly describe my invention, I shall have reference to the accompanying drawing in which the same is shown in its preferred form and in which:

Fig. 1 is a side elevation of a portion of an automobile showing my improved bed attached thereto and folded for transportation.

Fig. 2 is a view similar to that of Fig. 1 and shows the bed unfolded and covered with a canvas.

Fig. 3 is an end view of the parts shown in Fig. 2, but with the canvas removed.

Fig. 4 is a section taken on line 4—4, Fig. 7, the spring fabric and the tension springs being omitted for the sake of clearness.

Fig. 5 is a section similar to that shown in Fig. 4, but shows the bed in folded position.

Fig. 6 is a transverse section taken on line 6—6, Fig. 4.

Fig. 7 is a plan view of the bed in extended position.

Fig. 8 is a section taken along line 8—8, Fig. 7, and shows how the construction may be strengthened by suitable braces whenever it is found desirable to do so; and Fig. 9 is a section taken on line 9—9, Fig. 8 and shows how the brace member may be embedded in the wood.

The same reference characters will be employed to designate the same parts throughout the several views.

Numeral 1 represents the automobile as a whole and 2 represents the bed which is attached thereto and which forms the subject matter of the present invention.

The bed consists of two sections indicated, respectively, as A and B. Section A is intended to be bolted into place on the rear of the automobile body, while section B is hinged to section A and can be moved into either one of the positions shown in Figs. 1 and 2. Section A has a bottom 3, sides 4 and 5, and an end 6, and section B has a bottom 7, sides 8 and 9 and an end 10. Sides 4 and 5 have their ends cut on an angle to the plane of the bottom 3, as indicated at 11. The sides 8 and 9 have their ends cut at such an angle to the bottom 7 that they will be parallel with the edges 11 when the bed is in extended position. The section marked B is wider than section A to the extent of the combined thickness of the sides 4 and 5 and therefore fits on the outside of section A. The two sections are hinged or pivoted at 12. The bottoms 3 and 7 lie in the same plane when the bed is extended, in the manner shown in Figs. 2, 4 and 8, and therefore it terminates a short distance from the ends of the sides 8 and 9 as the latter overlap the sides 4 and 5. It is now evident that sections A and B can be rotated about the pivot 12 into the position shown in Figs. 1 and 5 or into the position shown in Figs. 2, 4, 7 and 8. When the sections A and B are folded, the ends near the pivot will be open and I have therefore provided a door 13 which is hinged to the rear end of the bottom 3 so as to permit it to be moved upwardly into the position shown in Fig. 1 for the purpose of closing the end of the bed, or downwardly into the position shown in Fig. 4. In order to strengthen the bed, it may be reinforced as shown in Fig. 8 by means of steel bars 14 and 15, bar 15 being embedded as shown in Fig. 9.

The spring on which the mattress and bedding is to rest, consists of two U-shaped angle iron frames 16 and 17 which are connected by means of links 18 which are pivoted at their center points 19 to the sides 4 and 5. The frame members 16 and 17 are supported near their bases by means of links 20 whose lower ends are pivotally connected to brackets 21. Springs 22 connect the bases of each frame member to the end pieces 6 and 10. An ordinary spring fabric 23 is secured to the frames 16 and 17 by means of coil springs 24. A brace rod 25 may be provided between the links 18 if desired, although this is not considered to be essential.

In order to enable the bed to be covered by a canvas, I provide two bows 26 and 27 which are each preferably formed from three parts. A bowed portion 28 and two straight sides 29 and 30 which are connected by means which admits of adjustment being made. The bows 26 and 27 may be folded as shown in Fig. 5 or extended as shown in Fig. 2 for the reception of a canvas 31 which may be provided with a window 32.

When the bed is folded into the position shown in Fig. 5, the spring frames 16 and 17 will assume substantially the position shown so as to provide space for the bed clothes. A door 33 at the end of section B permits the space between the spring 23 and the bottom 7 to be used for storage.

It is evident from the above description that I have produced a folding bed that is well adapted to be secured to an automobile body or built into the same and which is provided with a spring so constructed and arranged that it will fold with the bed in such a manner that space will be provided for the bed clothes.

Having now described my invention, what I claim as new is:

1. In a folding bed adapted to be attached to an automobile body, a pair of bed sections each having two sides, one end and a bottom, one of said sections being wider than the other so that the outside of one of the sections fits between the sides of the other section, means comprising pivots for connecting the sections together in such a manner that they may be folded, a bed spring secured to said sections, said spring comprising two U-shaped frame members, links pivotally connected to the ends of the frame members, said links being pivoted intermediate their ends to the sides of one of said sections, springs connecting the bases of each frame to the end of a section and supporting links pivotally secured to the bottom of each section and to the frames for supporting the ends thereof.

2. In a folding bed adapted to be attached to an automobile body, a pair of bed sections each having two sides, one end and a bottom, one of said sections being wider than the other so that the outside of one of the sections fits between the sides of the other section, means comprising pivots for connecting the sections together in such a manner that they may be folded, a bed spring secured to said sections, said spring comprising two U-shaped frame members, links pivotally connected to the ends of the frame members, said links being pivoted intermediate their ends to the sides of one of said sections, springs connecting the bases of each frame to the end of a section and supporting links pivotally secured to the bottom of each section and to the frames for supporting the ends thereof, and a link fabric secured to the base portions of each frame member by means of tension springs.

In testimony whereof I affix my signature.

CLIFFORD V. SMOTHERS.